F. P. BRUST.
COOKING UTENSIL.
APPLICATION FILED OCT. 17, 1910.
1,003,428.
Patented Sept. 19, 1911.
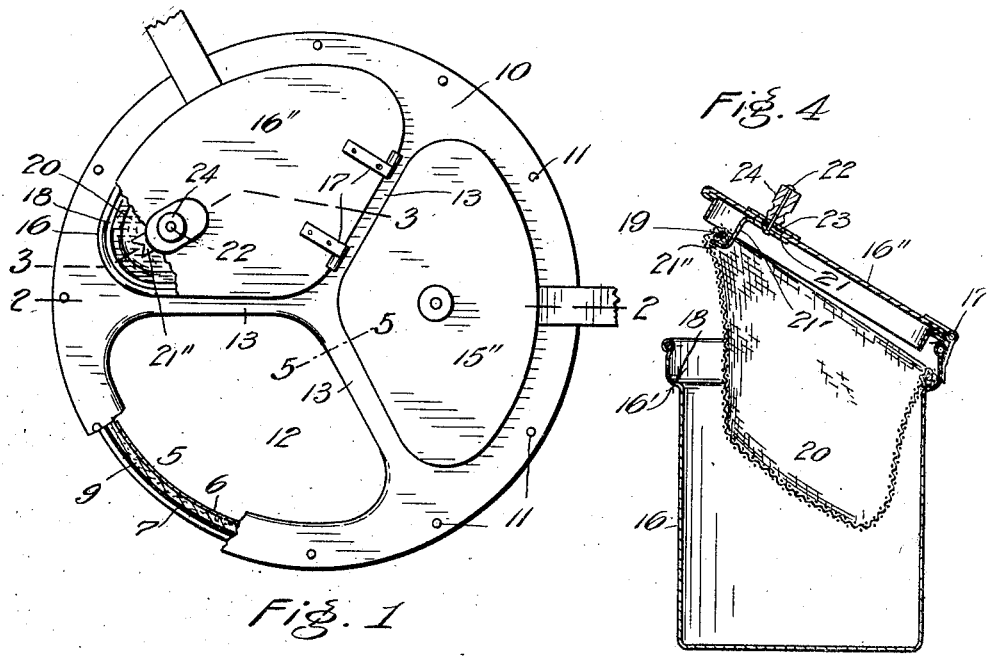
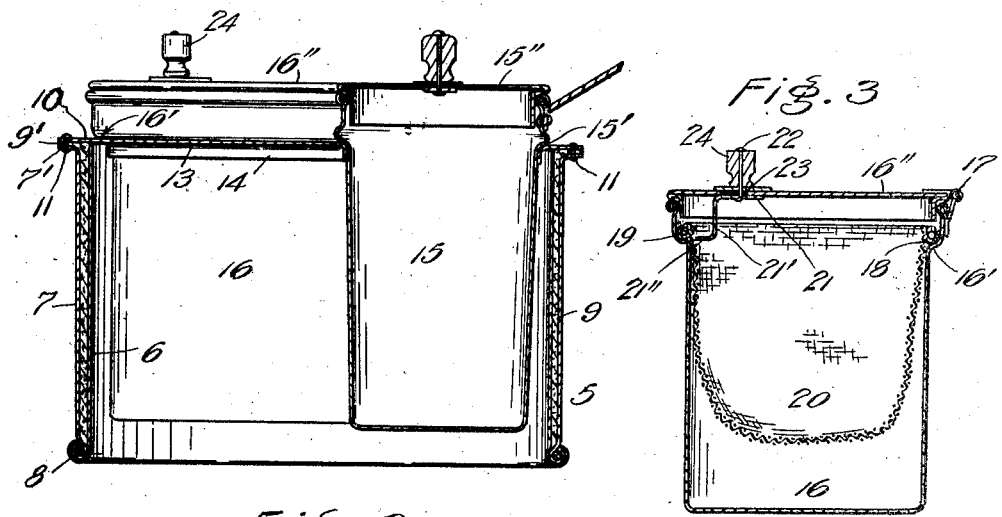
WITNESSES:
H. Barnes
E. Peterson
INVENTOR:
Frank P. Brust
BY
Pierre Barnes
ATTORNEY

UNITED STATES PATENT OFFICE.

FRANK P. BRUST, OF TACOMA, WASHINGTON.

COOKING UTENSIL.

1,003,428.   Specification of Letters Patent.   Patented Sept. 19, 1911.

Application filed October 17, 1910. Serial No. 587,578.

*To all whom it may concern:*

Be it known that I, FRANK P. BRUST, a citizen of the United States, residing at Tacoma, in the county of Pierce and State of Washington, have invented certain new and useful Improvements in Cooking Utensils, of which the following is a specification.

This invention relates to that class of cooking utensils wherein a number of vessels may be simultaneously employed for cooking separately a variety of foods by the heat produced from a single gas burner or its equivalent.

The object of my invention is the improvement in devices of this character in order to economize fuel and also to render the duties of the attendant less arduous.

With these ends in view, the invention consists in the novel construction, adaptation and combination of parts, as will be hereinafter described and claimed.

In the accompanying drawings, Figure 1 is a plan view of an embodiment of my invention. Fig. 2 is a vertical section taken through 2—2 of Fig. 1. Fig. 3 is a vertical section of one of the cooking vessels shown in the preceding views and taken substantially on line 3—3 of Fig. 1. Fig. 4 is a view similar to Fig. 3 with the vessel's lid and associated parts disposed in different positions from which they are therein represented. Fig. 5 is a detail cross sectional view of a bar-member of the casing top taken through 5—5 of Fig. 1.

The reference numeral 5 designates the circular wall of a bottomless casing or drum and is constructed with an inner shell 6 and an outer shell 7. Said shells are connected about their lower end by a roll joint (Fig. 2) with a wire ring 8. Above this joint said shells are spaced apart for the reception of a packing 9 of asbestos or other suitable material possessing a heat insulating quality. The upper edge of the outer shell 7 is provided with an outwardly extending flange 7' over which is advantageously placed a layer 9' of the packing, and above this layer is placed the casing-top 10. Rivets 11, or the like, extend through said flange top and intervening layer of packing to unite the same with a non-leakable joint which will prevent the escape of combustion gases thereat. The casing-top is provided with a number of substantially sector shaped apertures, such as 12, which are arranged symmetrically with respect to the center of the top and separated by radially disposed bars 13. About the several apertures there are provided downwardly projected marginal flanges 14 which serve to strengthen the structure of said top and likewise afford walls, so to speak, to obstruct the outflow of the heated gases from the casing. Provided for each of said apertures is a cooking vessel, as 15 or 16, formed with a head or shoulder, as 15' or 16', extending thereabout to support the respective vessels by resting upon the upper surface of the top so that the bottoms of the vessels will be located at a distance above the plane of the casing bottom. The vessel 15 may be utilized for any purpose for which a kettle or the like is adapted, and is illustrated with a removable lid 15''. The other vessel, 16, is intended to be used as a coffee pot and is provided with a lid 16'' which is secured along one of its edges by the vessel by means of hinges 17. The portion of the vessel 16 above the shoulder 16' is offset to provide a shelf 18 within the vessel for the support of a wire 19 to which the upper edge of a strainer-sack 20 is permanently secured.

Slidably connected to the underside of the vessel lid 16'' is a plate 21 having a depending arm 21' which terminates in a forwardly directed finger 21''. The connection between said plate and the lid is obtained by a bolt 22 extending through an elongated hole 23 in the lid, and having an enlarged head or handle 24 mounted upon its protruding end. In making coffee, the sack would be first inserted within the vessel 16 so that the attached wire 19 thereof will be borne by the shelf 18 as represented in Fig. 3. Ground coffee is then deposited in the sack and boiling water poured thereupon which passes through the coffee and the containing sack into the lower part of the vessel where the water is subjected to heat imparted from the fire over which the shell 5 is placed. The water is thus caused to boil in the vessel until the coffee within the sack is sufficiently decocted. After the water has been poured into the sack, as aforesaid, it is obvious that the lid 16'' should be closed to conserve the strength and aroma of the produced beverage. When the coffee is deemed to be cooked, the sack should be removed, which is accomplished by first moving forward the plate-finger 21" through the instrumentality of the handle 24 to engage the sack-wire 19 and then, by opening the lid, the wire is tilted up into the position represented in Fig. 4 to be conveniently removed with a fork or the like. The lid may now be closed until the coffee is to be served. The manner of using the other type of vessel, 15, is apparent.

The more notable advantages of the invention is the adaptation of a sectional cooking utensil to the economical use of heat which is due to the insulating construction of the casing and the employment of the depending flanges 14 about the peripheries of the casing-top to obstruct the outflow of the hot gases in the interstices between such top and the inserted vessels. Furthermore, the construction and adaptation of one of the vessels as an efficient coffee-pot renders the invention exceptionally valuable in affording a complete cooker, for an ordinary meal.

What I claim is—

1. In a cooking utensil, a vessel provided with an internal shelf, a lid hinged to the vessel, a sack, a wire attached to the sack about its mouth, a finger carried by said lid, and means operable from the outside of the lid whereby the finger may be actuated to engage with or be disengaged from said wire.

2. In a cooking utensil, a vessel provided with an internal shelf in proximity to its upper edge, a lid hingedly connected to the vessel, a sack arranged to be inserted within the vessel and adapted to be supported from said shelf, and devices carried by the lid whereby the sack may be partially raised by the opening of the lid.

FRANK P. BRUST.

Witnesses:
PIERRE BARNES,
M. A. BRUST.